(12) United States Patent
Kim et al.

(10) Patent No.: US 11,729,918 B2
(45) Date of Patent: Aug. 15, 2023

(54) ELECTRONIC DEVICE COMPRISING REMOVABLE ADHESIVE MEMBER

(71) Applicant: Samsung Electronics Co., Ltd., Suwon-si (KR)

(72) Inventors: Jungtae Kim, Suwon-si (KR); Hyukjae Jang, Suwon-si (KR); Hoonhee Lee, Suwon-si (KR); Jaehyung Lee, Suwon-si (KR); Hyeyeon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 15/733,265

(22) PCT Filed: Nov. 30, 2018

(86) PCT No.: PCT/KR2018/015044
§ 371 (c)(1),
(2) Date: Jun. 18, 2020

(87) PCT Pub. No.: WO2019/124810
PCT Pub. Date: Jun. 27, 2019

(65) Prior Publication Data
US 2020/0389984 A1 Dec. 10, 2020

(30) Foreign Application Priority Data
Dec. 18, 2017 (KR) .................. 10-2017-0174239

(51) Int. Cl.
*H05K 5/00* (2006.01)
*B32B 7/14* (2006.01)
(Continued)

(52) U.S. Cl.
CPC ............. *H05K 5/0017* (2013.01); *B32B 7/14* (2013.01); *C04B 37/005* (2013.01);
(Continued)

(58) Field of Classification Search
CPC .... H05K 5/0017; B32B 7/14; B32B 2457/00; B32B 2307/41; B32B 3/30; B32B 9/005;
(Continued)

(56) References Cited

U.S. PATENT DOCUMENTS

2009/0229732 A1  9/2009  Determan et al.
2015/0086767 A1  3/2015  Komatsuzaki et al.
(Continued)

FOREIGN PATENT DOCUMENTS

JP     2017-134887 A      8/2017
KR  10-2010-0070816 A     6/2010
(Continued)

OTHER PUBLICATIONS

International Search Report and Written Opinion of the International Searching Authority in connection with International Application No. PCT/KR2018/015044 dated Mar. 14, 2019, 13 pages.
(Continued)

*Primary Examiner* — Patricia D Valenzuela

(57) ABSTRACT

According to various embodiments, an electronic device may include a housing including a first side, a second side facing away from the first side, and a lateral side surrounding a space between the first side and the second side, a front plate disposed on the first side of the housing, a display disposed between the front plate and the first side such that at least part thereof is exposed through the front plate, at least one functional member disposed between the display and the first side, and an adhesive member disposed between the functional member and the first side to attach the functional member to the housing, wherein adhesive member includes an adhesive portion for attaching the functional member and the first side, and at least one non-adhesive portion extending from the adhesive portion. Various other embodiments are possible.

19 Claims, 18 Drawing Sheets

(51) Int. Cl.
  *H04M 1/02* (2006.01)
  *C04B 37/00* (2006.01)
  *H04R 7/18* (2006.01)
  *H04M 1/03* (2006.01)

(52) U.S. Cl.
  CPC ....... *H04M 1/0266* (2013.01); *B32B 2457/00* (2013.01); *H04M 1/035* (2013.01); *H04R 7/18* (2013.01)

(58) Field of Classification Search
  CPC . B32B 9/04; B32B 2457/20; B32B 2457/208; B32B 15/08; B32B 2307/412; B32B 7/12; B32B 15/18; B32B 15/20; B32B 27/06; C04B 37/005; H04M 1/0266; H04M 1/0249; H04M 1/0254; H04M 1/035; H04R 7/18
  See application file for complete search history.

(56) References Cited

U.S. PATENT DOCUMENTS

| | | | |
|---|---|---|---|
| 2016/0062516 A1* | 3/2016 | Jeong | G06F 1/1643 345/174 |
| 2016/0255182 A1* | 9/2016 | Lee | H04M 1/026 455/575.1 |
| 2016/0337757 A1* | 11/2016 | Ozasa | H04R 7/18 |
| 2016/0378246 A1 | 12/2016 | Kim | |
| 2019/0061318 A1 | 2/2019 | Jung et al. | |

FOREIGN PATENT DOCUMENTS

| | | |
|---|---|---|
| KR | 10-2010-0125398 A | 11/2010 |
| KR | 10-1574923 B1 | 12/2015 |
| KR | 10-2017-0004671 A | 1/2017 |
| KR | 10-2017-0040082 A | 4/2017 |
| KR | 10-2017-0093610 A | 8/2017 |
| KR | 10-2017-0136365 A | 12/2017 |
| WO | 2016117820 A1 | 7/2016 |

OTHER PUBLICATIONS

Korean Intellectual Property Office, "Notice of Preliminary Rejection" dated Oct. 29, 2021, in connection with Korean Patent Application No. 10-2017-0174239, 16 pages.

Notice of Patent Grant dated Apr. 27, 2022, in connection with Korean Application No. 10-2017-0174239, 4 pages.

* cited by examiner

ELECTRONIC DEVICE COMPRISING REMOVABLE ADHESIVE MEMBER

CROSS-REFERENCE TO RELATED APPLICATIONS

This application is a 371 National Stage of International Application No. PCT/KR2018/015044, filed Nov. 30, 2018, which claims priority to Korean Patent Application No. 10-2017-0174239, filed Dec. 18, 2017, the disclosures of which are herein incorporated by reference in their entirety.

BACKGROUND

1. Field

Various embodiments of the present disclosure relate to an electronic device including a removable adhesive member.

2. Description of Related Art

With a significant decrease in a functional gap of each manufacturer, an electronic device has become slimmer to satisfy purchasing needs of consumers, and is under development to improve rigidity of the electronic device and to differentiate functional elements thereof while enhancing a design aspect.

The electronic device may include a plurality of electronic components disposed therein, and may be efficiently disposed in consideration of space utilization. According to an embodiment, the electronic device may be considered to have an excellent disassembly property in maintenance of the electronic device, in addition to an efficient disposition structure.

SUMMARY

An electronic device may include a housing providing rigidity and a display stacked on the housing. The electronic device may include at least one stacked member interposed between the display and the housing. The stacked member may include a polymer member which provides a cushioning action at a rear side of the display or a conductive member disposed on block noise or to dissipate heat. According to an embodiment, each of the stacked members may be assembled to be mutually attached by means of an adhesive member having specific adhesive strength.

The display of the electronic device needs to be separated from the housing to replace at least one electronic component disposed therein. Therefore, the adhesive member may be configured such that adhesive strength is decreased when a specific physical property (e.g., heat, ultrasonic, etc.) is applied, thereby easily separating an adherend.

However, since at least one adhesive member disposed between the display and the housing has the same adhesive strength, an unwanted damage may occur in the stacked member when the display is separated. For example, when the display is separated, if a conductive member (e.g., a Cu sheet) disposed therebetween is not separated together with the display but remains in the housing, there may be a problem in that the conductive member also has to be newly replaced. In addition, even if the conductive member is separated together with the display, there may be a problem in that it is difficult to separate an adhesive member remaining on a surface of the housing or the conductive member.

According to various embodiments of the present disclosure, there may be provided an electronic device including a removable adhesive member.

According to various embodiments, there may be provided an electronic device including a removable adhesive member having an improved separation structure.

According to various embodiments, there may be provided an electronic device including a removable adhesive member configured such that an adhesive member remaining after separating a component can be easily separated.

According to various embodiments, an electronic device may include a housing including a first side, a second side facing away from the first side, and a lateral side surrounding a space between the first side and the second side, a front plate disposed on the first side of the housing, a display disposed between the front plate and the first side such that at least part thereof is exposed through the front plate, at least one functional member disposed between the display and the first side, and an adhesive member disposed between the functional member and the first side to attach the functional member to the housing. The adhesive member may include an adhesive portion for attaching the functional member and the first side, and at least one non-adhesive portion extending from the adhesive portion.

According to various embodiments, an electronic device may include a first structure, a second structure coupled to the first structure, and an adhesive member disposed between the second structure and the first structure to attach the second structure to at least a partial region of the first structure. The adhesive member may include an adhesive portion for attaching the first structure and the second structure, and at least one non-adhesive portion extending from the adhesive portion.

According to various embodiments of the present disclosure, a desired stacked member can be easily separated by differently configuring adhesive strength of an adhesive member between stacked members, and an improved adhesive structure can be provided to easily separate the adhesive member remaining after the separation, thereby enabling efficient maintenance of an electronic device.

DETAILED DESCRIPTION

Figure 1:
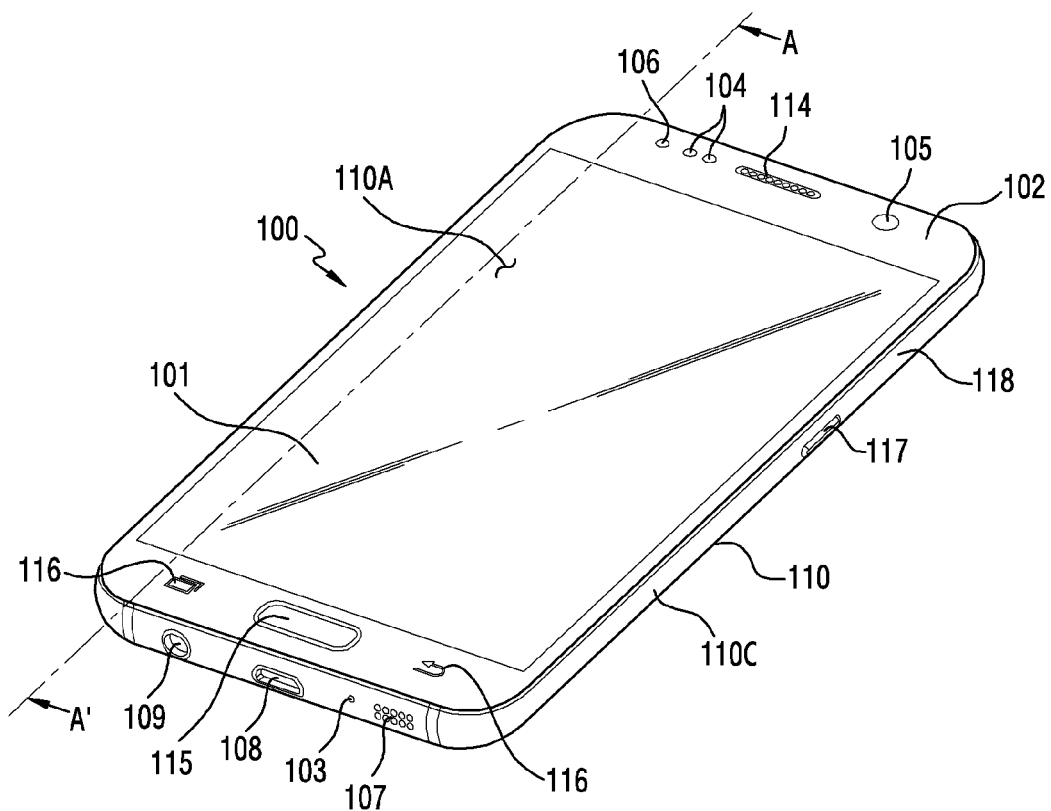
FIG. 1 is a perspective view illustrating a front side of an example mobile electronic device according to various embodiments of the present disclosure.
Figure 2:
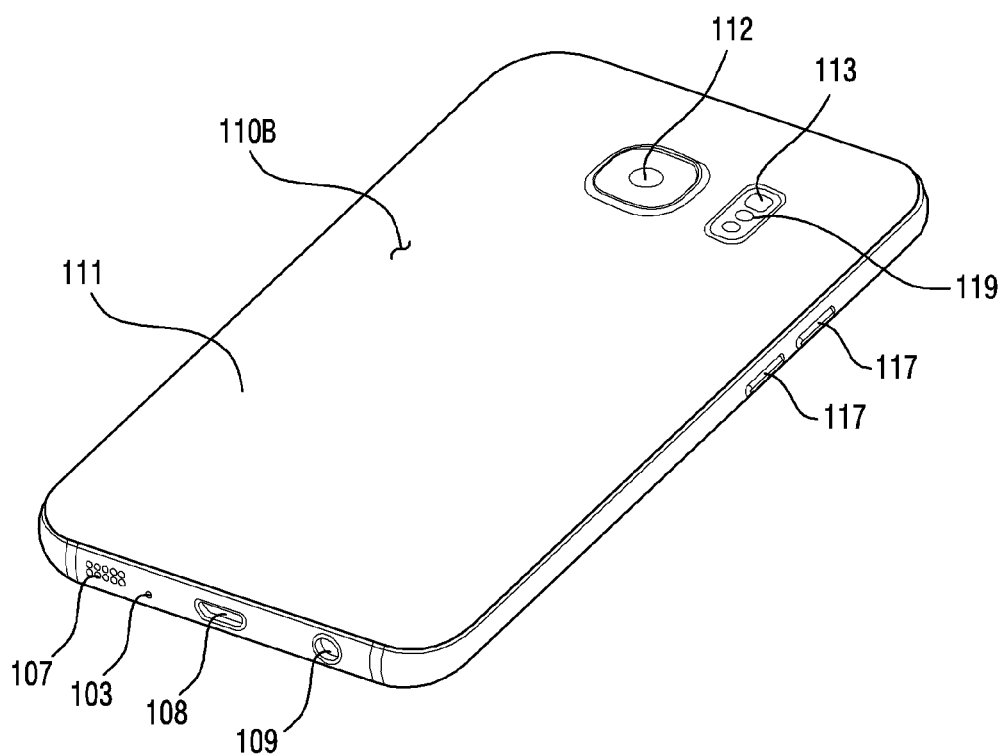
FIG. 2 is a perspective view illustrating a back side of an example electronic device of FIG. 1 according to various embodiments of the present disclosure.

FIG. 1 is a front perspective view illustrating an example mobile electronic device according to various embodiments. FIG. 2 is a rear perspective view illustrating an example mobile electronic device of FIG. 1.

Referring to FIG. 1 and FIG. 2, an electronic device 100 according to an embodiment may include a housing 110 including a first side (or a front side) 110A, a second side (or a rear side) 110B, and a lateral side (surface) 110C surrounding a space between the first side 100A and the second side 110B. In another embodiment (not shown), the housing may refer to a structure which includes part of the first side 110A, second side 110B, and third side 110C of FIG. 1. According to an embodiment, the first side 110A may be constructed of a front plate 102 (or a front cover) (e.g., a polymer plate or a glass plate having various coating layers) which is at least partially transparent. The second side 110B may be constructed of a rear plate 111 (or a rear cover) which may be opaque. For example, the rear plate 111 may be constructed, for example, and without limitation, of coated or colored glass, ceramic, polymer, metallic materials (e.g. aluminum, stainless steel (STS), or magnesium), a combination of at least two of these materials, or the like. The lateral side 110C (or a side member or side surface) may be constructed of a lateral bezel structure (or a lateral member) 118 bonded to the front plate 102 and the rear plate 111 and including, for example, and without limitation, metal and/or polymer. In some embodiments, the rear plate 111 and the lateral bezel structure 118 may be constructed integrally and may include the same material (e.g., a metallic material such as aluminum).

According to an embodiment, the electronic device 100 may include, for example, and without limitation, at least one or more of a display 101, an input device 103, audio output devices 107, and 114, sensor modules 104, 119, camera modules 105, 112, and 113, and key input devices 115, 116 and 117, an indicator 106, and connector holes 108 and 109. In various example embodiments, the electronic device 100 may omit at least one (e.g., the key input devices 115, 116 and 117 or the indicator 106) of these components or may additionally include other components.

The display 101 may be exposed through, for example, some portions of the front plate 102. In an example embodiment, a portion of the display 101 may be exposed through the front plate 102 forming the first side 110A and the first region 110D of the lateral side 110C. The display 101 may be disposed adjacent to or bonded to, for example, and without limitation, a touch sensing circuit, a pressure sensor capable of measuring touch strength (pressure), and/or a digitizer for detecting a stylus pen of a magnetic field type. In an example embodiment, at least portion of the sensor modules 104, 119 and/or at least portion of the key input devices are disposed on the first portion 110D and/or the second portion 110E.

The audio modules 103, 107, and 114 may include a microphone hole 103 and speaker holes 107 and 114. A microphone for acquiring external sound may be disposed inside the microphone hole 103. In some embodiments, a plurality of microphones may be disposed to sense a direction of the sound. The speaker holes 107 and 114 may include the external speaker hole 107 and the receiver hole 114 for a call. In some embodiments, the speaker holes 107 and 114 and the microphone hole 103 may be implemented as a single hole, or a speaker (e.g., a piezo speaker) may be included without the speaker holes 107 and 114.

The sensor modules 104 and 119 may generate an electrical signal or data value corresponding to an internal operating state of the electronic device 100 or an external environmental state. The sensor modules 104 and 119 may include, for example, the first sensor module 104 (e.g., a proximity sensor) and/or second sensor module (not shown) (e.g., a fingerprint sensor) disposed to the first side 110A of the housing 110, and/or the third sensor module 119 (e.g., an HRM sensor) disposed to the second side 110B of the housing 110. The fingerprint sensor may be disposed to a portion of the first side 110A (e.g., a home key button 115) or the second side 110B of the housing or below the display 101. The electronic device 100 may further include at least one of a sensor module (not shown), for example, and without limitation, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor 104, or the like.

The camera modules 105, 112, and 113 may include the first camera device 105 disposed to the first side 110A of the electronic device 100, the second camera device 112 disposed to the second side 110B, and/or the flash 113. The camera modules 105 and 112 may include one or more lenses, an image sensor, and/or an image signal processor. The flash 113 may include, for example, and without limitation, a Light Emitting Diode (LED), a xenon lamp, or the like. In some embodiments, two or more lenses (wide angle and telephoto lenses) and image sensors may be disposed to one side of the electronic device 100.

The key input devices 115, 116, and 117 may include the home key button 115 disposed to the first side 110A of the housing 110, the touch pad 116 disposed around the home key button 115, and/or the side key button 117 disposed to the lateral side 110C of the housing 110. In another embodiment, the electronic device 100 may not include some or all of the aforementioned key input devices 115, 116, and 117. The key input devices 115, 116, and 117, which are not included, may be implemented using a soft key displayed on the display 101 or a in a pressure sensor included in the display 101.

The indicator 106 may be disposed to, for example, the first side 110A of the housing 110. The indicator 106 may provide, for example, state information of the electronic device 100 in an optical form and may include an LED (light emitting diode).

The connector holes 108 and 109 may include the first connector hole 108 capable of accommodating a connector (e.g., a USB connector) for transmitting/receiving power and/or data of an external electronic device and/or the second connector hole or earphone jack 109 capable of accommodating a connector for transmitting/receiving an audio signal with respect to the external electronic device.

Figure 3:
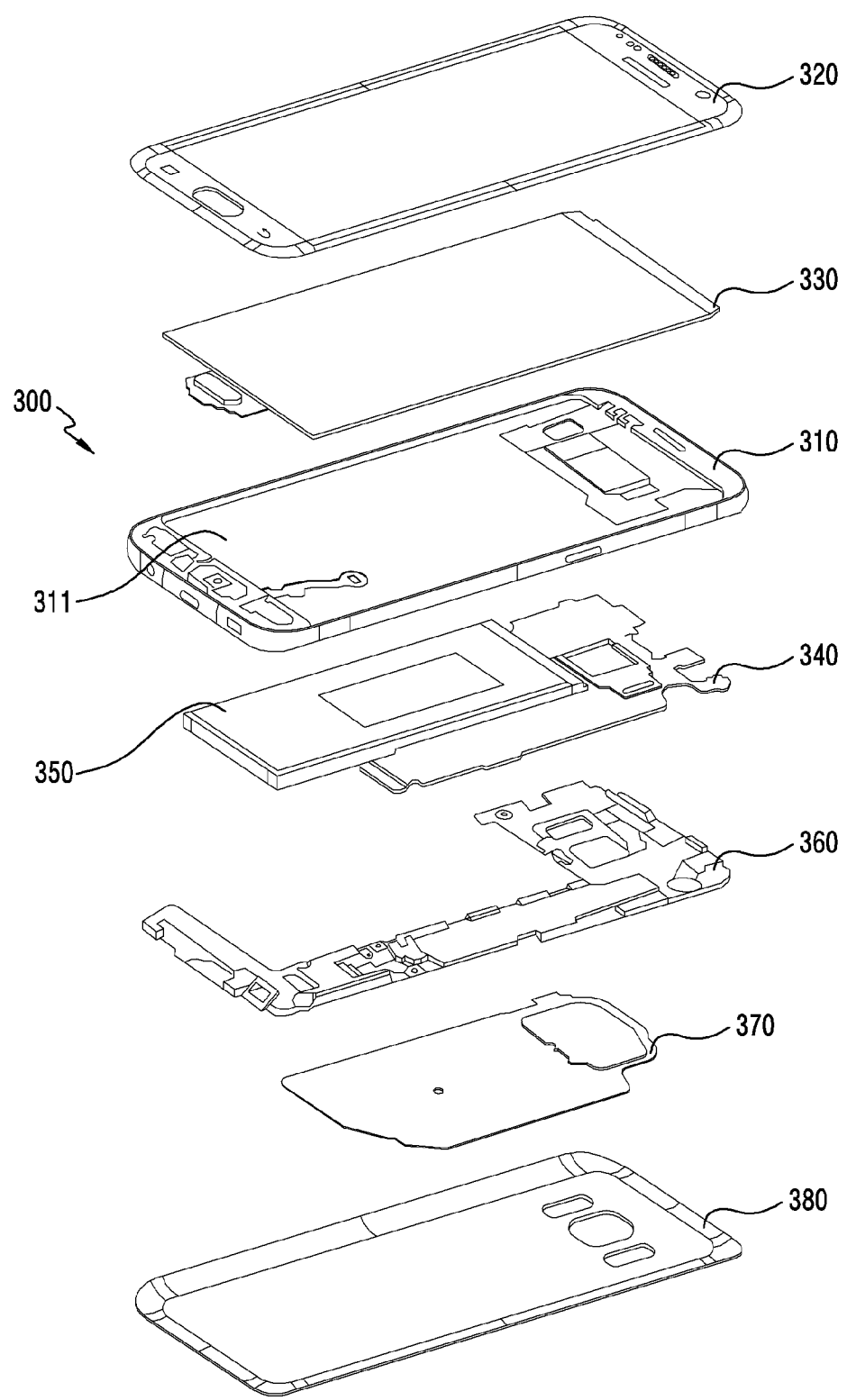
FIG. 3 is an exploded view illustrating an example electronic device of FIG. 1 according to various embodiments of the present disclosure.

FIG. 3 is an exploded perspective view illustrating an example electronic device of FIG. 1 according to various embodiments.

Referring to FIG. 3, an electronic device 300 (e.g., the electronic device 100 of FIG. 1 or FIG. 2) may include a lateral bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, the electronic device 300 may omit at least one (e.g., the first support member 311) of these components, or may additionally include other components. At least one of the components of the electronic device 300 may be the same as or similar to at least one of the components of the electronic device 100 of FIG. 1 or FIG. 2, and redundant descriptions will not be repeated here.

The first support member 311 may be coupled with the lateral bezel structure 310 by being disposed inside the electronic device 300 or may be constructed integrally with respect to the lateral bezel structure 310. The first support member 311 may be constructed of, for example, and without limitation, a metal material and/or non-metal material (e.g., polymer), or the like. The display 330 may be bonded to one side of the first support member 311, and the printed circuit board 340 may be bonded to the other side thereof. A processor, a memory, and/or an interface may be mounted on the printed circuit board 340. The processor may include various processing circuitry, such as, for example, and without limitation, one or more of a central processing unit, an application processor, a graphic processing unit, an image signal processor, a sensor hub processor, a communication processor, or the like.

The memory may include, for example, a volatile memory or a non-volatile memory.

The interface may include, for example, and without limitation, a High Definition Multimedia Interface (HDMI), a Universal Serial Bus (USB) interface, a Secure Digital (SD) card interface, an audio interface, or the like. For example, the interface may electrically or physically couple the electronic device 300 and the external electronic device, and may include a USB connector, an SD card/MMC connector, or an audio connector.

As a device for supplying power to at least one component of the electronic device 300, the battery 350 may include, for example, and without limitation, a non-rechargeable primary cell, a rechargeable secondary cell, a fuel cell, or the like. At least one portion of the battery 350 may be disposed on the same plane substantially with respect to, for example, the printed circuit board 340. The battery 350 may be disposed integrally inside the electronic device 100, or may be detachably disposed with respect to the electronic device 300.

The antenna 370 may be disposed between the rear plate 380 and the battery 350. The antenna 370 may include, for example, and without limitation, a Near Field Communication (NFC) antenna, a wireless charging antenna, a Magnetic Secure Transmission (MST) antenna, or the like. The antenna 370 may perform short-range communication, for example, with the external electronic device, or may wirelessly transmit/receive the power required for charging. In another embodiment, an antenna structure may be constructed by at least part of the lateral bezel structure 310 and/or the first support member 311 or a combination thereof.

Figure 4:
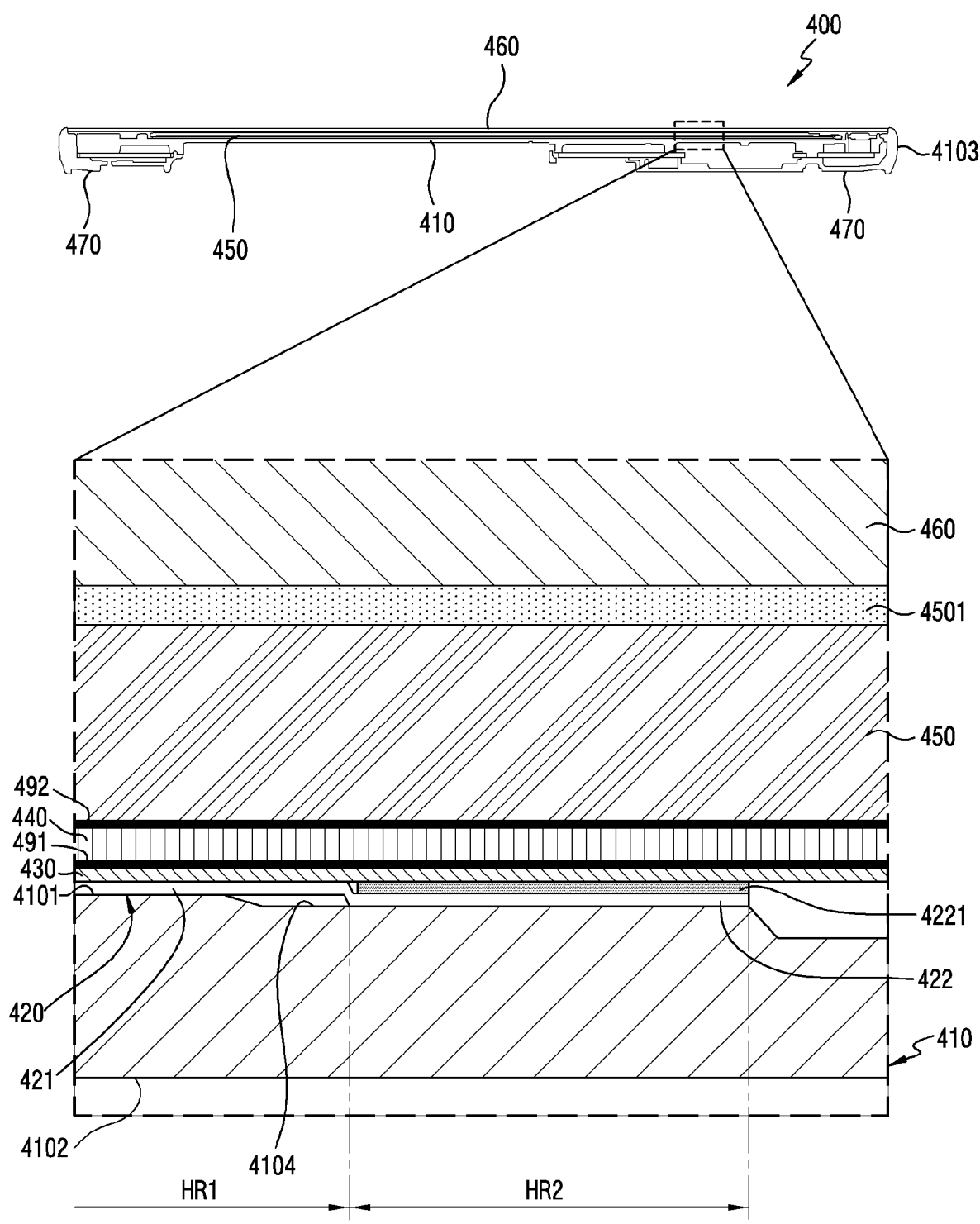
FIG. 4 is a cross-sectional view illustrating a state where a display is disposed on a housing according to various embodiments of the present disclosure.

FIG. 4 is a cross-sectional view illustrating a state where a display is disposed on a housing according to various embodiments of the present disclosure. FIG. 4 is a cross-sectional view seen from the line A-A' of FIG. 1.

An electronic device 400 of FIG. 4 may be at least in part similar to the electronic device 100 of FIG. 1 and FIG. 2 or the electronic device 300 of FIG. 3, or may include other embodiments of the electronic device.

Referring to FIG. 4, the electronic device 400 may include a housing 410. According to an embodiment, the housing 410 may include a first side 4101, a second side 4102 facing the first side 4101, and a lateral side 4103 surrounding the first side 4101 and the second side 4102 and providing a thickness of the housing 410. According to an embodiment, the electronic device 400 may further include at least one support member 470 coupled to at least a partial region of the housing 410 to reinforce rigidity of the electronic device 400 and to support surrounding electronic components. According to an embodiment, at least part of the lateral side of the housing 410 may be disposed in an exposed manner to construct an exterior of the electronic device 400. According to an embodiment, the housing 410 may be formed of a conductive member (e.g., a metal material) and/or a non-conductive member (e.g., synthetic resin). According to an embodiment, when the housing 410 is formed of the conductive member and the non-conductive member, it may be formed through a process such as double injection or the like.

According to various embodiments, the electronic device 400 may include a conductive member 430, polymer member 440, display 450 (e.g., display module, display panel, etc.), and front plate 460 (e.g., window, transparent plate, transparent window, front cover, etc.) sequentially disposed on the first side 4101 of the housing 410. According to an embodiment, the electronic device 400 may include a touch sensor 4501 disposed between the display 450 and the front plate 460. According to an embodiment, the aforementioned stacked members 430, 440, 450, and 460 may be attached by means of adhesive members 420, 491, and 492. According to an embodiment, the adhesive members 420, 491, and 492 may include at least one of an Optically Clear Adhesive (OCA), a Pressure Sensitive Adhesive (PSA), a general adhesive, and a thermally reactive adhesive tape (HR tape). Although not shown, the touch sensor may also be attached between the display and the front plate by means of an optical adhesive member (e.g., OCA).

According to various embodiments, one or more stacked member 430 and 440 among the aforementioned stacked members may perform various functions depending on materials thereof. According to an embodiment, the conductive member 430 may include a metal member of a plate type (e.g., a film type) for shielding noise and dissipating heat emitted from surrounding heat emitting components. According to an embodiment, the conductive member 430 may include cupper (Cu). According to an embodiment, the polymer member 440 may be attached to a rear side of the display 450, and may perform a cushioning action. According to an embodiment, the polymer member 440 may facilitate to show a background when the display is off, by applying dark color (e.g., black). Although not shown, the aforementioned stacked member may further include a waterproof member (e.g., a waterproof tape) which replaces the conventional tape which exists for the purpose of waterproofing and/or a waterproof member (e.g., a waterproof tape) which is additionally disposed.

According to various embodiments, in the electronic device 400, the display 450 may be separated from the housing 410 for the purpose of maintenance or the like. According to an embodiment, the conductive member 430 disposed closest to the housing 410 may be formed to be separated from the housing 410 in a state of being attached to a rear side of the display (e.g., a rear side of the polymer member 440) separated from the housing 410. According to an embodiment, when the display 450 is separated from the housing 410, adhesive strength of the adhesive member 491 disposed between the conductive member 430 and the polymer member 440 may be configured to be greater than adhesive strength of the adhesive member 420 disposed between the housing 410 and the conductive member 430. Accordingly, when the display 450 is separated from the housing 410, the conductive member 430 may be separated in a state of being attached to the rear side of the polymer member 440.

According to various embodiments, when the display 450 is separated from the housing 410, the adhesive member 420 disposed between the conductive member 430 and the housing 410 may also be configured to be separated from the housing 410 together with the conductive member 430. In this case, the adhesive member 420 may be configured to be separated in a state of being attached to the conductive member 430 by allowing adhesive layers (e.g., adhesive layers 623-1 and 623-2 of FIG. 6A) disposed on respective sides facing a base member (e.g., a base member 621 of FIG. 6A) to have different adhesive strength. According to an embodiment, since it may be configured such that adhesive strength of a first adhesive layer (e.g., the first adhesive layer 623-1 of FIG. 6A) disposed between the base member (e.g., the base member 621 of FIG. 6A) and the conductive member 430 is configured to be greater than or equal to adhesive strength of a second adhesive layer (e.g., the second adhesive layer 623-2 of FIG. 6A) disposed between the base member (e.g., the base member 621 of FIG. 6A) and the housing 410, the adhesive member 420 can be separated together with the conductive member 430.

According to various embodiments, the adhesive member 420 disposed between the housing 410 and the conductive member 430 may include an adhesive portion 421 corresponding to an adhesive region HR1 adhered to the conductive member 430, and a non-adhesive portion 422 corresponding to a non-adhesive region HR2 not adhered to the conductive member 430. According to an embodiment, when the display 450 is separated from the housing 410, the non-adhesive portion 422 may perform a function as a detachment introducing portion (e.g., a handle portion for separation) to easily separate the adhesive member 420 attached to a rear side of the conductive member 430 after the display 450 is separated from the housing 410. According to an embodiment, the non-adhesive portion 422 can prevent the conductive member 430 from being damaged and deformed, by easily separating the adhesive member 420 from the conductive member 430 after the display 450 is separated from the housing 410. According to an embodiment, the non-adhesive portion 422 may include a non-adhesive layer 4221 disposed between the conductive member 430 and the non-adhesive portion 422. According to an embodiment, the non-adhesive layer 4221 may include an additional printed layer or non-adhesive tape attached to the non-adhesive portion 422. However, without being limited thereto, the non-adhesive layer 4221 may be implemented by removing a adhesive layer disposed on the adhesive portion 421. According to an embodiment, the non-adhesive layer 4221 may be achieved by removing the adhesive layer from the adhesive portion by using a laser or the like.

According to various embodiments, in order to compensate for a thickness of the non-adhesive layer 4221 disposed on the non-adhesive portion 422 of the adhesive member 420, the housing 410 may include a recess 4104 formed to have a specific size and depth to house the non-adhesive layer 4221 in a corresponding region. According to an embodiment, the recess 4102 may be formed to be lower than the first side 4101 of the housing 410. According to an embodiment, the depth of the recess 4104 may be at least greater than the thickness of the non-adhesive layer 4221. In this case, when the display 450 and the housing 410 are completely assembled, at least part protruding in the non-adhesive portion 422 of the adhesive member 420 disposed between a conductive member and the housing 410 may be mounted to the recess 4104 of the housing 410, thereby preventing from being lifted at a periphery thereof, caused by the thickness of the non-adhesive layer 4221. According to an embodiment, when the housing 410 is implemented in a relatively thin plate shape, the recess 4104 may be replaced with a hole connected from the first side 4101 of the housing 410 to the second side 4102.

Figure 5:
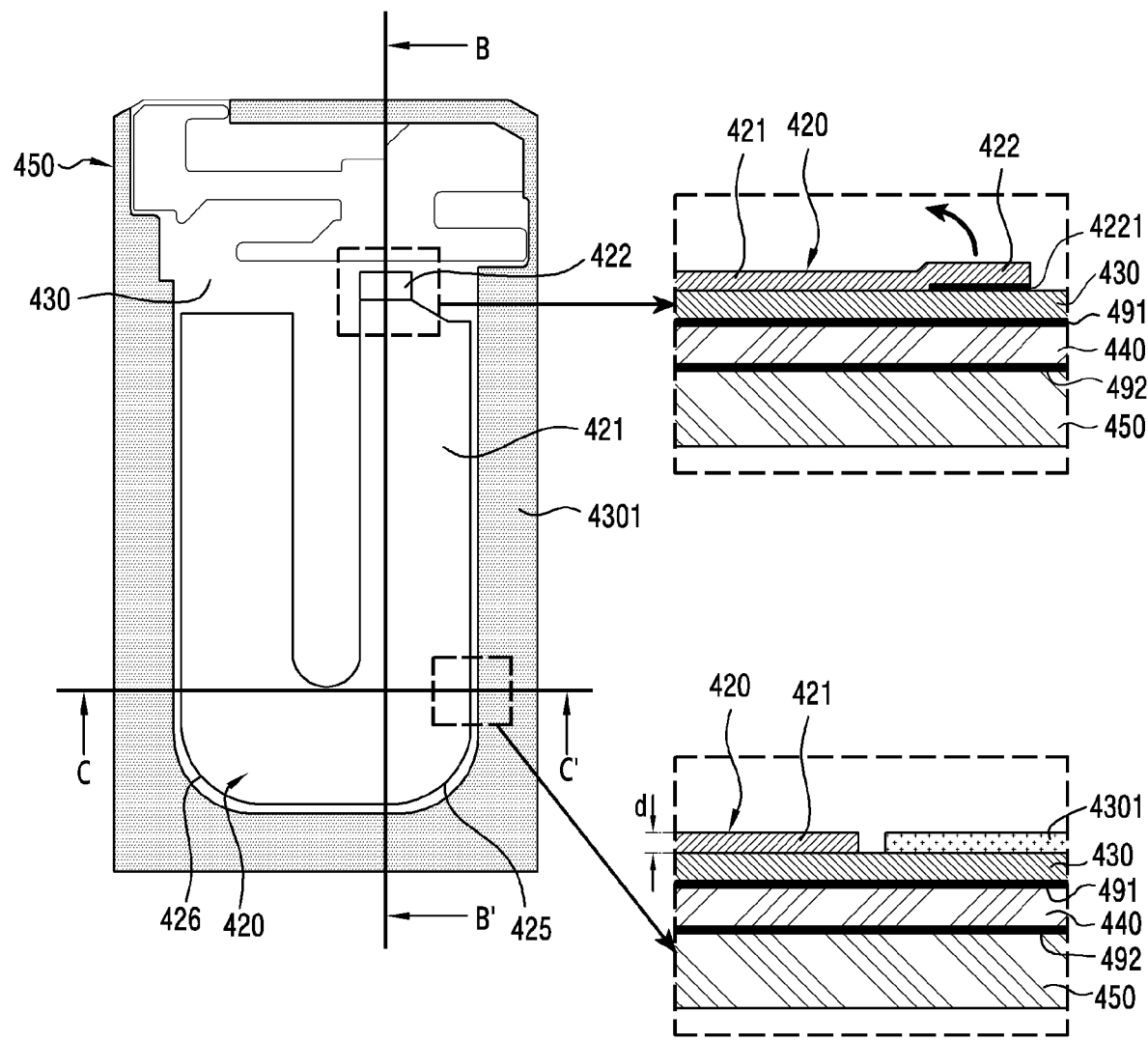
FIG. 5 illustrates a structure of a display to which an adhesive member is attached according to various embodiments of the present disclosure.

FIG. 5 illustrates a structure of a display to which an adhesive member is attached according to various embodiments of the present disclosure. FIG. 5 may include a cross-sectional view illustrating an essential part seen from the link B-B' and a cross-sectional view illustrating an essential part seen from the line C-C'.

Referring to FIG. 5, as a drawing illustrating a rear side of a display 450 separated from a housing (e.g., the housing 410 of FIG. 4) for the purpose of maintenance, when the display 450 is separated from a housing 410, a polymer member 440 attached to the rear side of the display 450, a conductive member 430 attached to a rear side of the polymer member 440, and an adhesive member 420 attached to a rear side of the conductive member 430 may be separated together.

According to various embodiments, since the adhesive member 420 attached to the conductive member 430 is separated from the housing 410, it may need to be replaced with a new adhesive member due to a decrease in adhesive strength. Therefore, the adhesive member 420 needs to be smoothly separated and removed from the conductive member 430 disposed on the rear side of the display 450. According to an embodiment, the adhesive member 420 may include at least one non-adhesive portion 422 extending from one end of an adhesive portion 421. According to an embodiment, the non-adhesive portion 422 may be used as a handle for smoothly separating the adhesive member 420 attached to the conductive member 430. Therefore, a user can separate the adhesive member 420 from the conductive member 430 by holding the non-adhesive portion 422 of the adhesive member 420, not having adhesive strength, and pulling it in a direction of the adhesive portion (an arrow direction in the figure).

According to various embodiments, the adhesive member 420 may be formed in a shape of 'U' so that it is smoothly separated from the conductive member 430 while minimizing a loss of an adhesive region. According to an embodiment, the adhesive member 420 may be formed such that one or more corner portions 425 and 426 of the adhesive portion 421 are rounded with a specific curvature, thereby preventing from being broken during the adhesive member 420 is separated.

According to various embodiments, the adhesive member 420 may be formed to have a disposition region that can be adhered to the housing 410 in at least a partial region of the conductive member 430. According to an embodiment, the remaining region in which the adhesive member is not provided in the conductive member 422 may be provided with a step difference compensation member 4301 for compensating for a step difference depending on a thickness of the adhesive member 420.

FIG. 6A to FIG. 6D illustrate a structure of an adhesive member according to various embodiments of the present disclosure.

An adhesive member 620 of FIG. 6A to FIG. 6D may be at least in part similar to the adhesive member 420 of FIG. 4, or may include other embodiments of the adhesive member.

According to various embodiments, the adhesive member 620 may include a base member 621 including a first member surface 6211 facing a display (e.g., the display 450 of FIG. 4) and a second side member 6212 facing a housing (e.g., the housing 410 of FIG. 4) in a direction opposite to the first side member 5211, a first adhesive layer 623-1 disposed on the first member surface 6211 of the base member 621, and a second adhesive layer 623-2 disposed on the second member surface 6212 of the base member 621. Since adhesive strength of the first adhesive layer 623-1 is configured to be greater than adhesive strength of the second adhesive layer 623-2, when a display (e.g., the display 450 of FIG. 4) is separated from the housing (e.g., the housing 410 of FIG. 4), the adhesive member 620 may be separated together with a conductive member (e.g., the conductive member 430 of FIG. 4) attached to a rear side of the display (e.g., the display 450 of FIG. 4).

According to various embodiments, the adhesive member 620 may include an adhesive region HR1 attached to the conductive member (e.g., the conductive member 430 of FIG. 4) and a non-adhesive region HR2 not attached to the conductive member (e.g., the conductive member 430 of FIG. 4). According to an embodiment, the adhesive member 620 may include a non-adhesive layer 624 disposed on each of the adhesive layers 623-1 and 623-2 in the non-adhesive region HR2 of the base member 621. According to an embodiment, the non-adhesive layer 624 may include a printed layer or tape attached to each of the adhesive layers 623-1 and 623-2. Therefore, although the adhesive region HR1 of the adhesive member 620 is attached to the conductive member (e.g., the conductive member 430 of FIG. 4), the non-adhesive region HR2 is not attached to a corresponding portion of the conductive member (e.g., the conductive member 430 of FIG. 4) and housing (e.g., the housing 410 of FIG. 4) due to the non-adhesive layer 624.

Figure 6A:
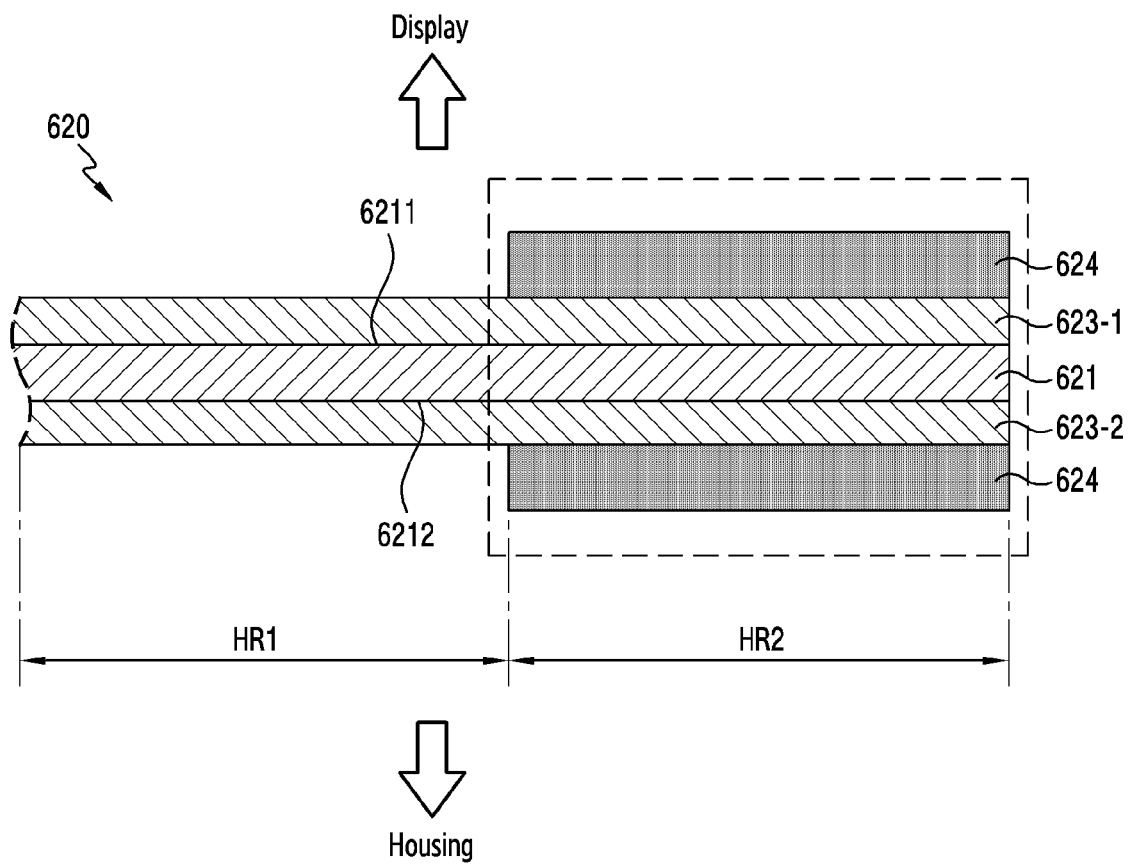
FIG. 6A illustrates a structure of an adhesive member according to various embodiments of the present disclosure.
Figure 6B:
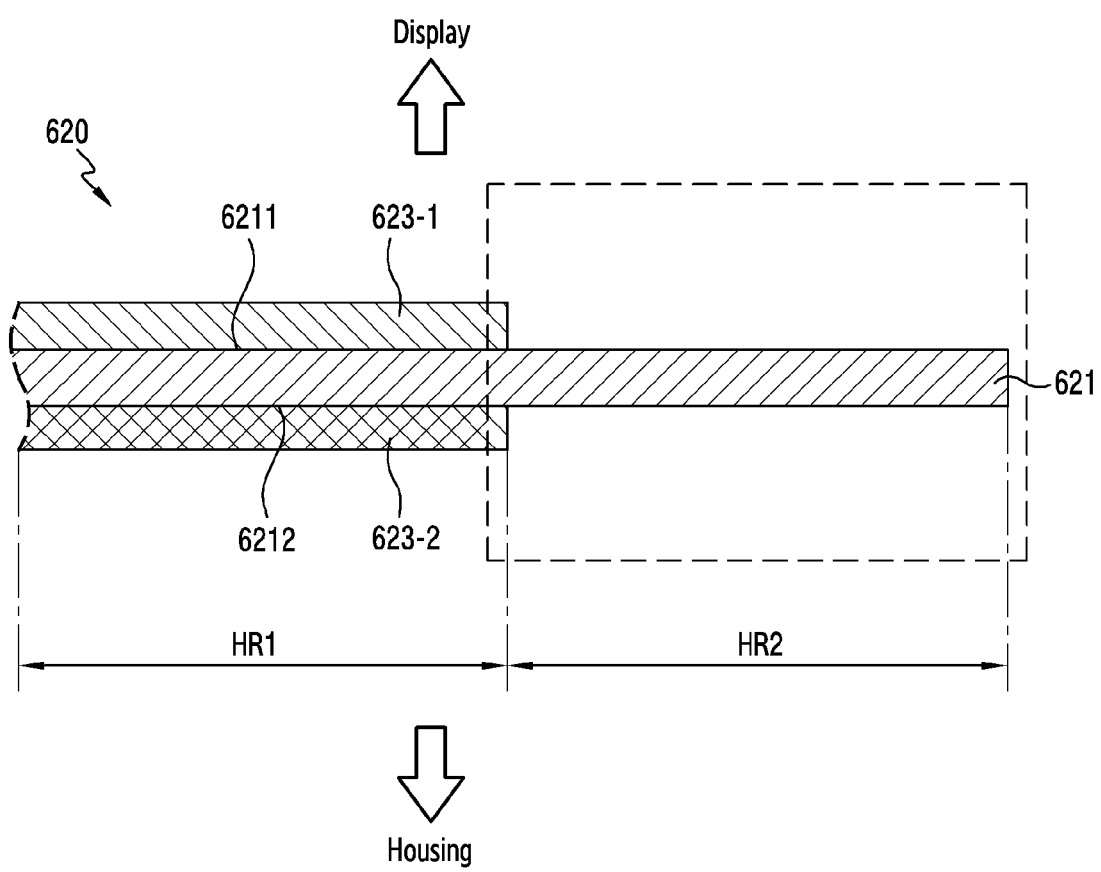
FIG. 6B illustrates a structure of an adhesive member according to various embodiments of the present disclosure.

Referring to FIG. 6B, in the non-adhesive region HR2 of the adhesive member 620, each of the adhesive layers 623-1 and 623-2 disposed on the base member 621 may be excluded. In this case, the adhesive region HR1 of the adhesive member 620 is attached to the conductive member (e.g., the conductive member 430 of FIG. 4), but the non-adhesive region HR2 is not attached to a corresponding portion of the conductive member (e.g., the conductive member 430 of FIG. 4) and housing (e.g., the housing 410 of FIG. 4) since the adhesive layers 623-1 and 623-2 are excluded. According to an embodiment, in the non-adhesive region HR2, the adhesive layers 623-1 and 623-2 of the corresponding region may be removed from the base member through laser processing or the like.

Figure 6C:
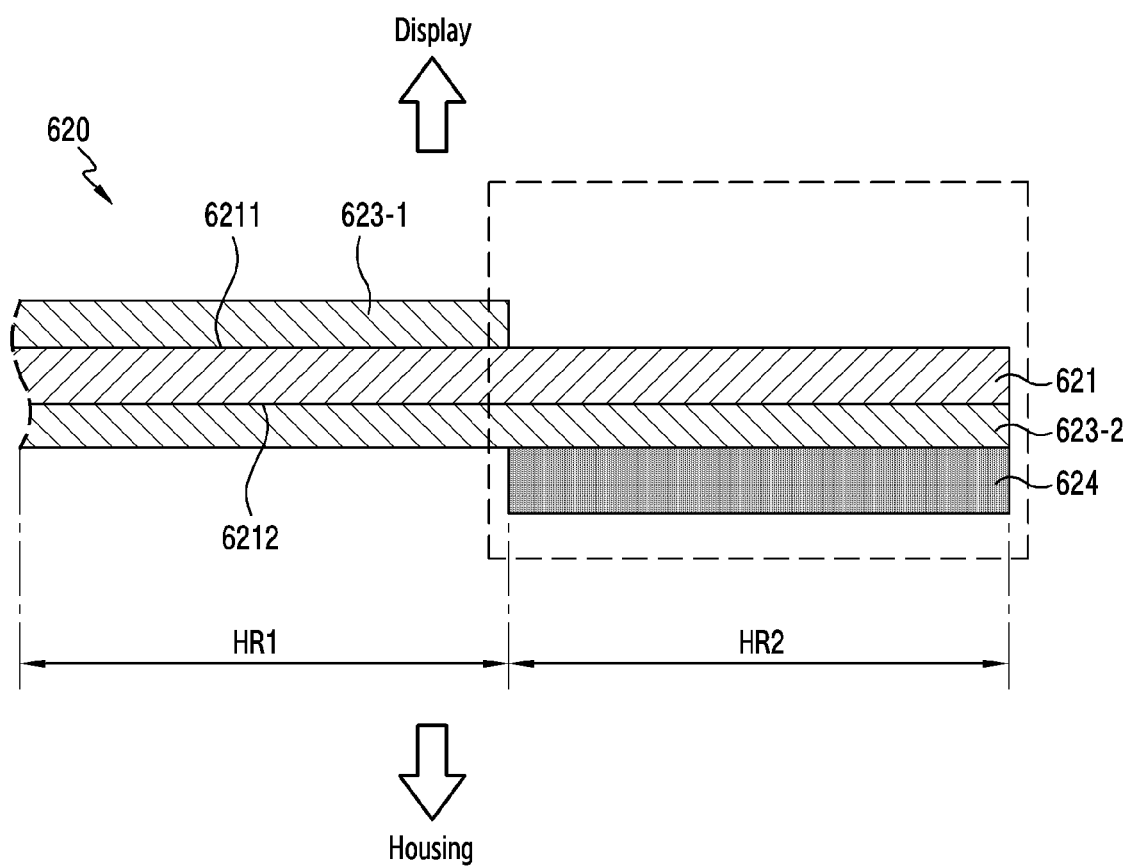
FIG. 6C illustrates a structure of an adhesive member according to various embodiments of the present disclosure.

Referring to FIG. 6C, in the non-adhesive region HR2 of the adhesive member 620, the first adhesive layer 623-1 disposed on the base member 621 may be excluded, and the non-adhesive layer 624 may be attached to the second adhesive layer 623-2. Likewise, in this case, the adhesive region HR1 of the adhesive member 620 is attached to the conductive member (e.g., the conductive member 430 of FIG. 4), but the non-adhesive region HR2 is not attached to a corresponding portion of the conductive member (e.g., the conductive member 430 of FIG. 4) and housing (e.g., the housing 410 of FIG. 4) since the first adhesive layer 623-1 is excluded and the non-adhesive layer 624 is applied to the second adhesive layer 623-2.

Figure 6D:
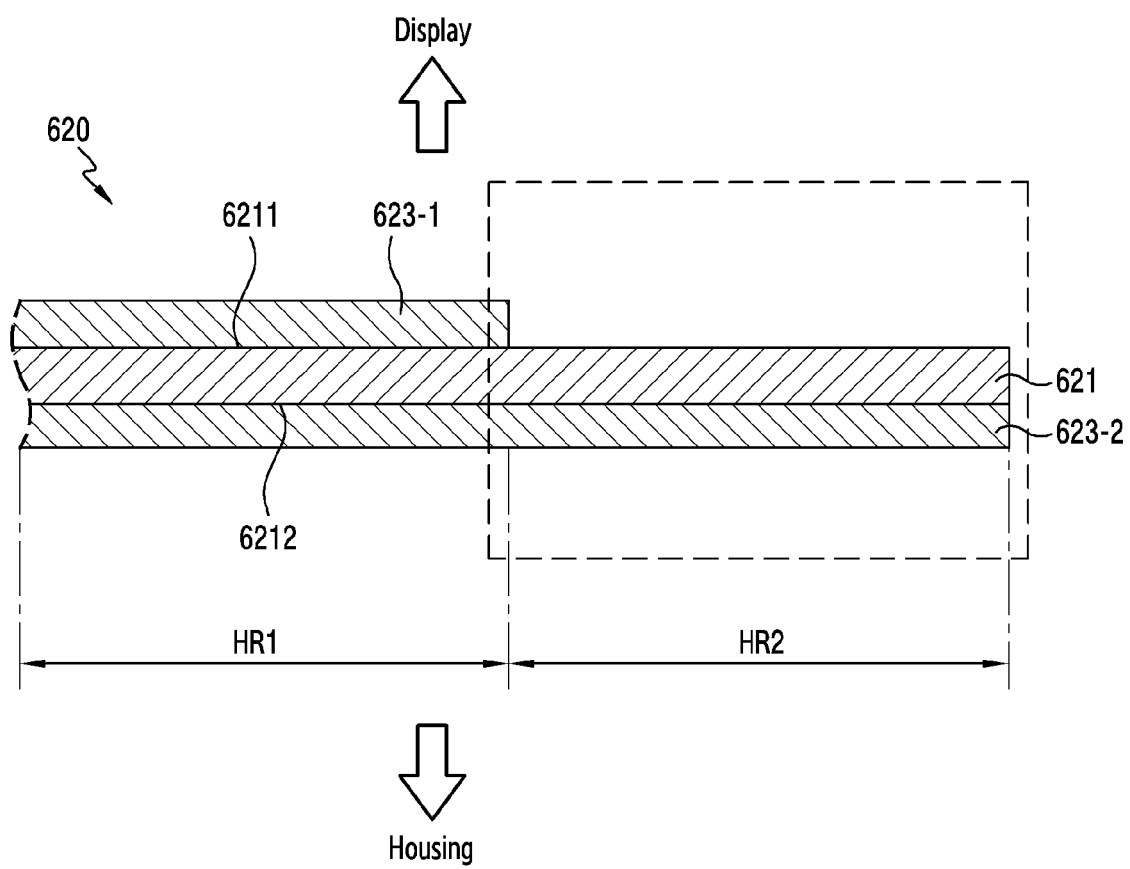
FIG. 6D illustrates a structure of an adhesive member according to various embodiments of the present disclosure.

Referring to FIG. 6D, in the non-adhesive region HR2 of the adhesive member 620, the first adhesive layer 623-1 disposed on the base member 621 may be excluded, and the second adhesive layer 623-2 may remain intact. In this case, although the second adhesive layer 623-2 is adhered to a housing (e.g., the housing 410 of FIG. 4), it may be easily separated from the housing (e.g., the housing 410 of FIG. 4) since an adhesive area of the adhesive member 620 corresponding to the non-adhesive region HR2 is relatively smaller than an adhesive area of the adhesive member 620 corresponding to the adhesive region HR1. Likewise, in this case, the adhesive region HR1 of the adhesive member 620 is attached to a conductive member (e.g., the conductive member 430 of FIG. 4), but the non-adhesive region HR2 is not attached to a corresponding portion of the conductive member (e.g., the conductive member 430 of FIG. 4) since the first adhesive layer 623-1 is excluded and the non-adhesive layer 624 is applied to the second adhesive layer 623-2.

Figure 7A:
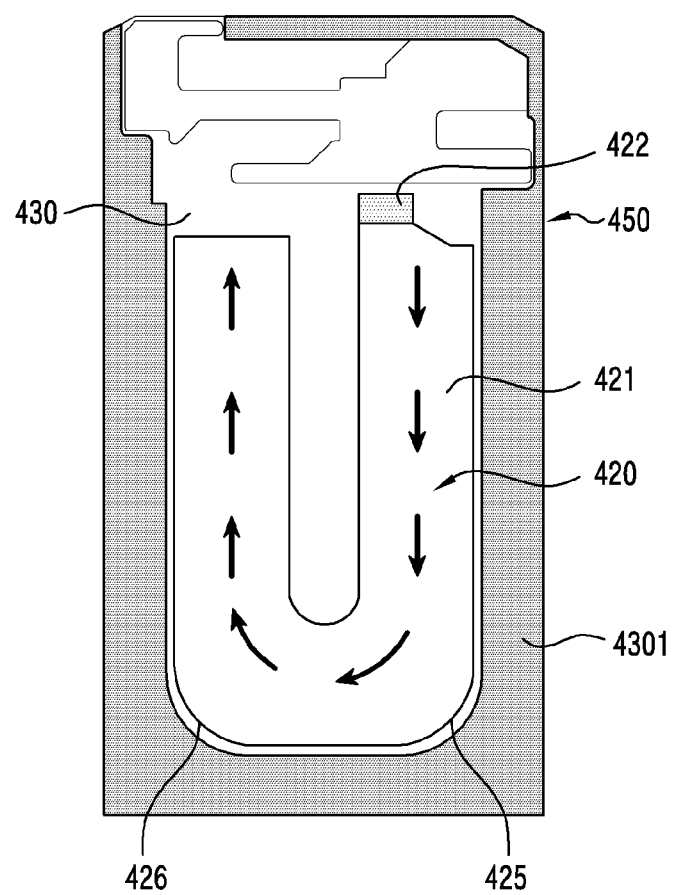
FIG. 7A illustrates a structure of an adhesive member according to various embodiments of the present disclosure.

FIG. 7A to FIG. 8B illustrate a structure of an adhesive member according to various embodiments of the present disclosure. FIG. 7A and FIG. 7B may describe various numbers of non-adhesive portions of an adhesive member.

Referring to FIG. 7A, an adhesive member 420 may include an adhesive portion 421 attached to a conductive member 430 disposed on a rear side of a display 450, and a non-adhesive portion 422 extending from one end of the adhesive portion 421. According to an embodiment, the adhesive member 420 may be formed in a shape of 'U' bent in opposite directions so that it is smoothly separated from the conductive member 430 while minimizing a loss of an adhesive region. According to an embodiment, the adhesive member 420 may be formed such that one or more corner portions 425 and 426 of the adhesive portion 421 are rounded with a specific curvature, thereby preventing from being broken during the adhesive member 420 is separated. However, without being limited thereto, an inner and/or outer corner of the adhesive member 420 may have a shape of a right angle. Accordingly, the adhesive member 420 may be smoothly separated from the conductive member 430 along an illustrated arrow direction from the non-adhesive portion 422.

Figure 7B:
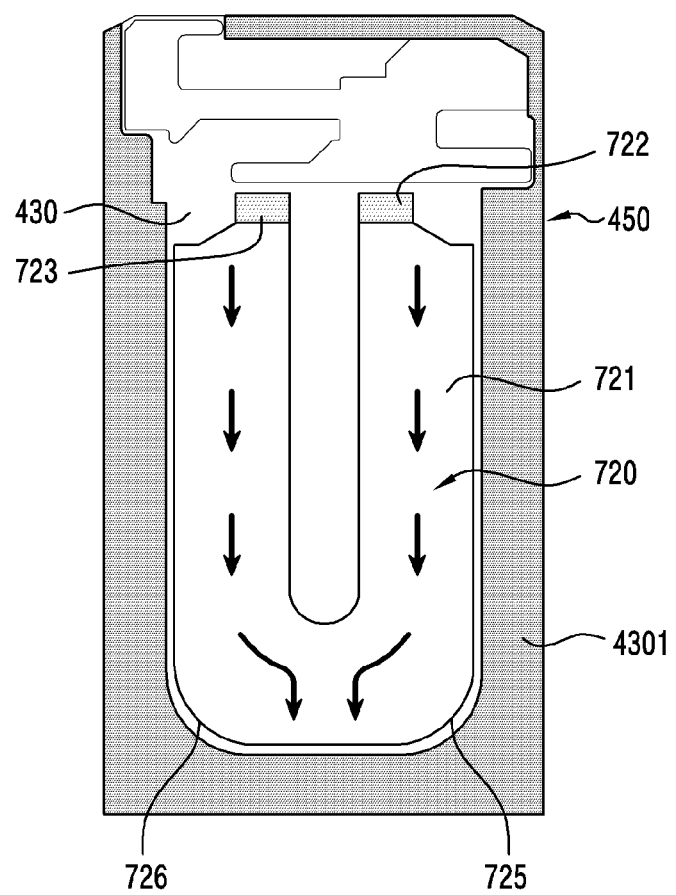
FIG. 7B illustrates a structure of an adhesive member according to various embodiments of the present disclosure.

Referring to FIG. 7B, an adhesive member 720 may include an adhesive portion 721 attached to the conductive member 430 disposed on the rear side of the display 450, and a pair of non-adhesive portions 722 and 723 having a specific length and/or area and extending from one end and the other end of the adhesive portion 721. According to an embodiment, the adhesive member 720 may be formed in a shape of 'U' bent in opposite directions so that it is smoothly separated from the conductive member 430 while minimizing a loss of an adhesive region. According to an embodiment, the adhesive member 720 may be formed such that one or more corner portions 725 and 726 of the adhesive portion 721 are rounded with a specific curvature, thereby preventing from being broken during the adhesive member 720 is separated. Accordingly, the adhesive member 720 may be smoothly separated from the conductive member 430 simultaneously along illustrated arrow directions from the pair of non-adhesive portions 722 and 723.

According to various embodiments, although the non-adhesive portions 422, 722, and 723 extending from one end and/or the other end of the adhesive members 620 and 720 are illustrated and explained as described above, the present disclosure is not limited thereto. According to an exemplary embodiment of the present disclosure, it is obvious that a non-adhesive portion of an adhesive member can be extracted in any number from any region of an adhesive portion, as well as both ends of the adhesive member within a range which allows a disposition space thereof.

Figure 8A:
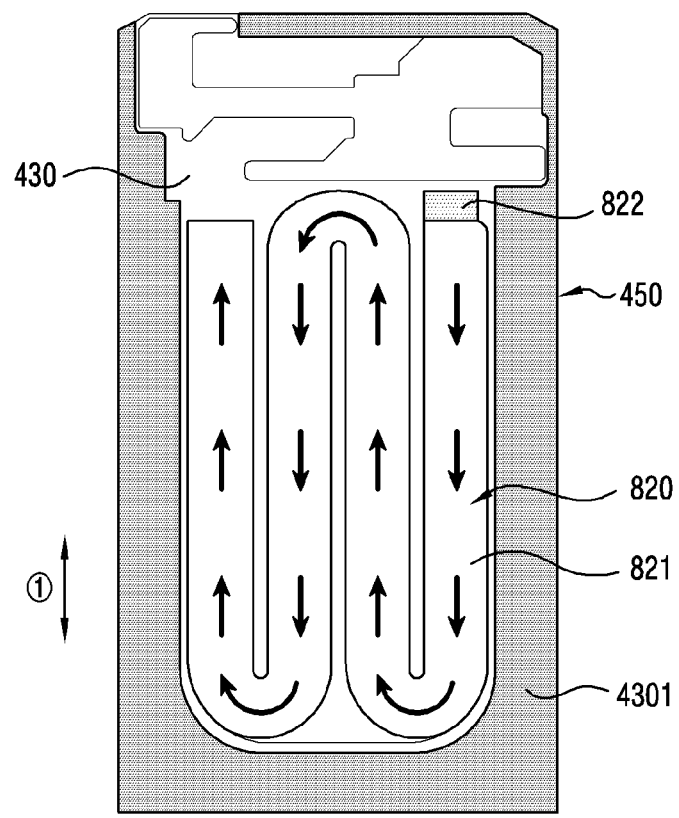
FIG. 8A illustrates a structure of an adhesive member according to various embodiments of the present disclosure.
Figure 8B:
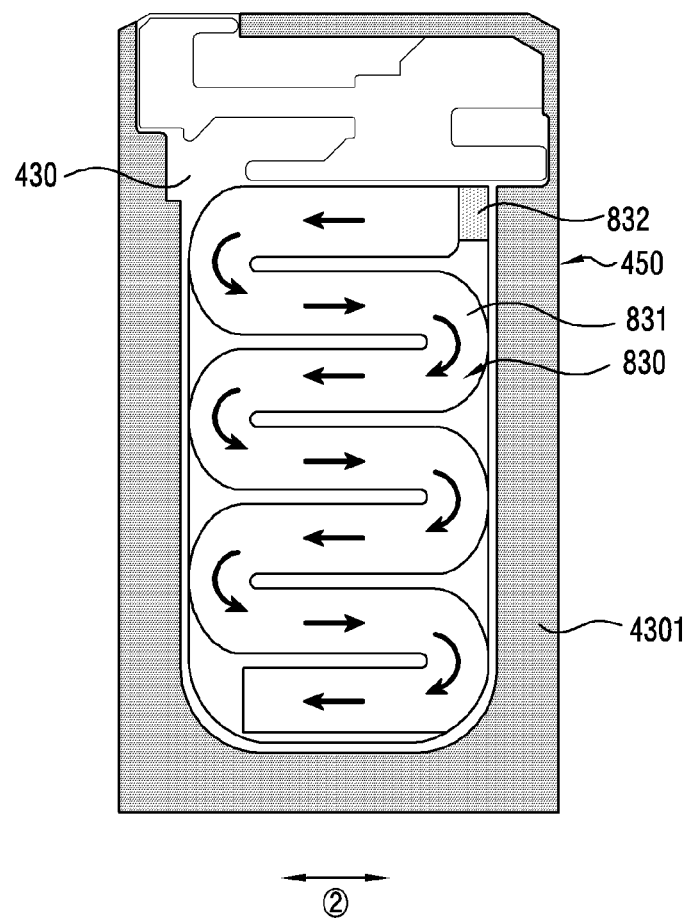
FIG. 8B illustrates a structure of an adhesive member according to various embodiments of the present disclosure.

FIG. 8A and FIG. 8B may describe various shapes of an adhesive portion of an adhesive member.

Referring to FIG. 8A, an adhesive member 820 may include an adhesive portion 821 attached to a conductive member 430 disposed on a rear side of a display 450 and a non-adhesive portion 822 extending from one end of the adhesive portion 821. According to an embodiment, the adhesive member 820 may be formed in a shape of bent several times alternately in opposite directions with respect to a length direction (e.g., a direction M) of the display 450 so that it is smoothly separated from the conductive member 430 while minimizing a loss of an adhesive region. In this case, an adhesive area is not decreased due to a multiple-bent shape of the adhesive portion 821, whereas a sequential separation area of the adhesive portion 821 separated from the non-adhesive portion 822 is relatively decreased. Therefore, the adhesive member 820 can be smoothly separated from the conductive member 430.

Referring to FIG. 8B, an adhesive member 830 may include an adhesive portion 831 attached to the conductive member 430 disposed on the rear side of the display 450, and a non-adhesive portion 832 extending from one end of the adhesive portion 831. According to an embodiment, the adhesive member 820 may be formed in a shape of bent several times alternately in opposite directions with respect to a width direction (e.g., a direction θ) of the display 450 so that it is smoothly separated from the conductive member 430 while minimizing a loss of an adhesive region. In this case, an adhesive area is not decreased due to a multiple-bent shape of the adhesive portion 831, whereas a sequential separation area of the adhesive portion 831 separated from the non-adhesive portion 832 is relatively decreased. Therefore, the adhesive member 830 can be smoothly separated from the conductive member 430.

Figure 9:
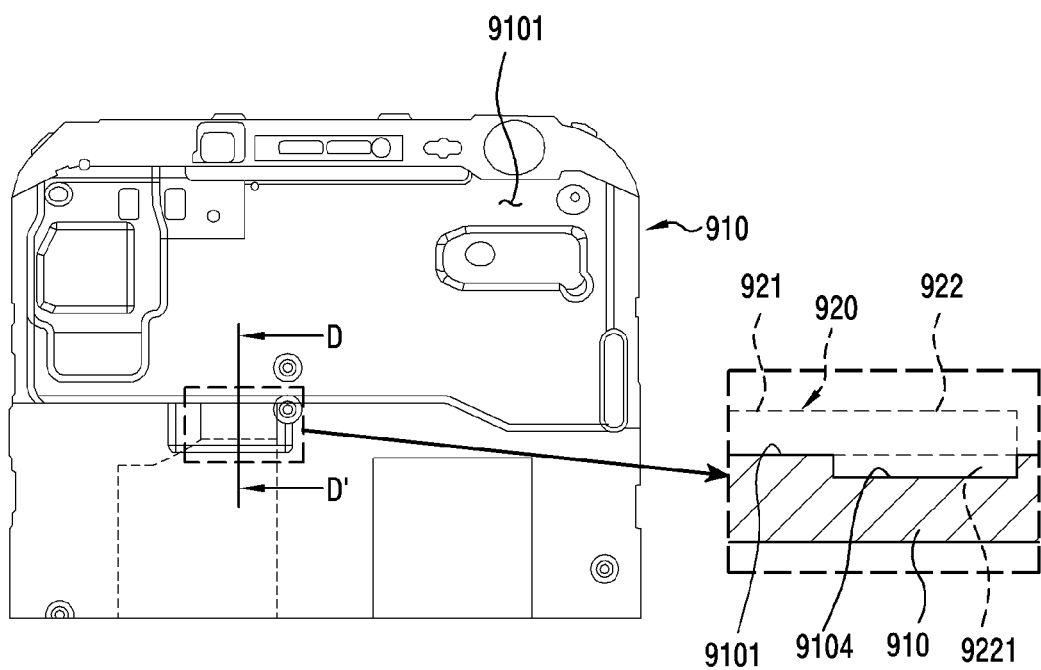
FIG. 9 illustrates a structure of a housing according to various embodiments of the present disclosure.

FIG. 9 illustrates a structure of a housing according to various embodiments of the present disclosure. FIG. 9 may include a cross-sectional view illustrating an essential part seen from the line D-D'.

A housing 910 of FIG. 9 may be at least in part similar to the housing 410 of FIG. 4, or may include other embodiments of the housing.

Referring to FIG. 9, an adhesive member 920 may include an adhesive portion 921 attached to a conductive member (e.g., the conductive member 430 of FIG. 4), and a non-adhesive portion 922 not attached to the conductive member (e.g., the conductive member 430 of FIG. 4). According to an embodiment, the non-adhesive portion 922 may include a non-adhesive layer 9221. According to an embodiment, in order to compensate for a thickness of the non-adhesive layer 9221 of the adhesive member 920, the housing 910 may include a recess 9104 formed to have a specific size and depth to house the non-adhesive layer 9221 in a corresponding region. According to an embodiment, the recess 9102 may be formed to be lower than a first side 9101 of the housing 910. According to an embodiment, the depth of the recess 9104 may be at least greater than the thickness of the non-adhesive layer 9221. In this case, when the display 450 and the housing 910 are completely assembled, at least part (e.g., the non-adhesive layer 9221) protruding in the non-adhesive portion 922 of the adhesive member 920 disposed between a conductive member (e.g., the conductive member 430 of FIG. 4) and the housing 910 may be mounted to the recess 9104 of the housing 910, thereby preventing from being lifted at a periphery thereof, caused by the thickness of the non-adhesive layer 9221.

Figure 10A:
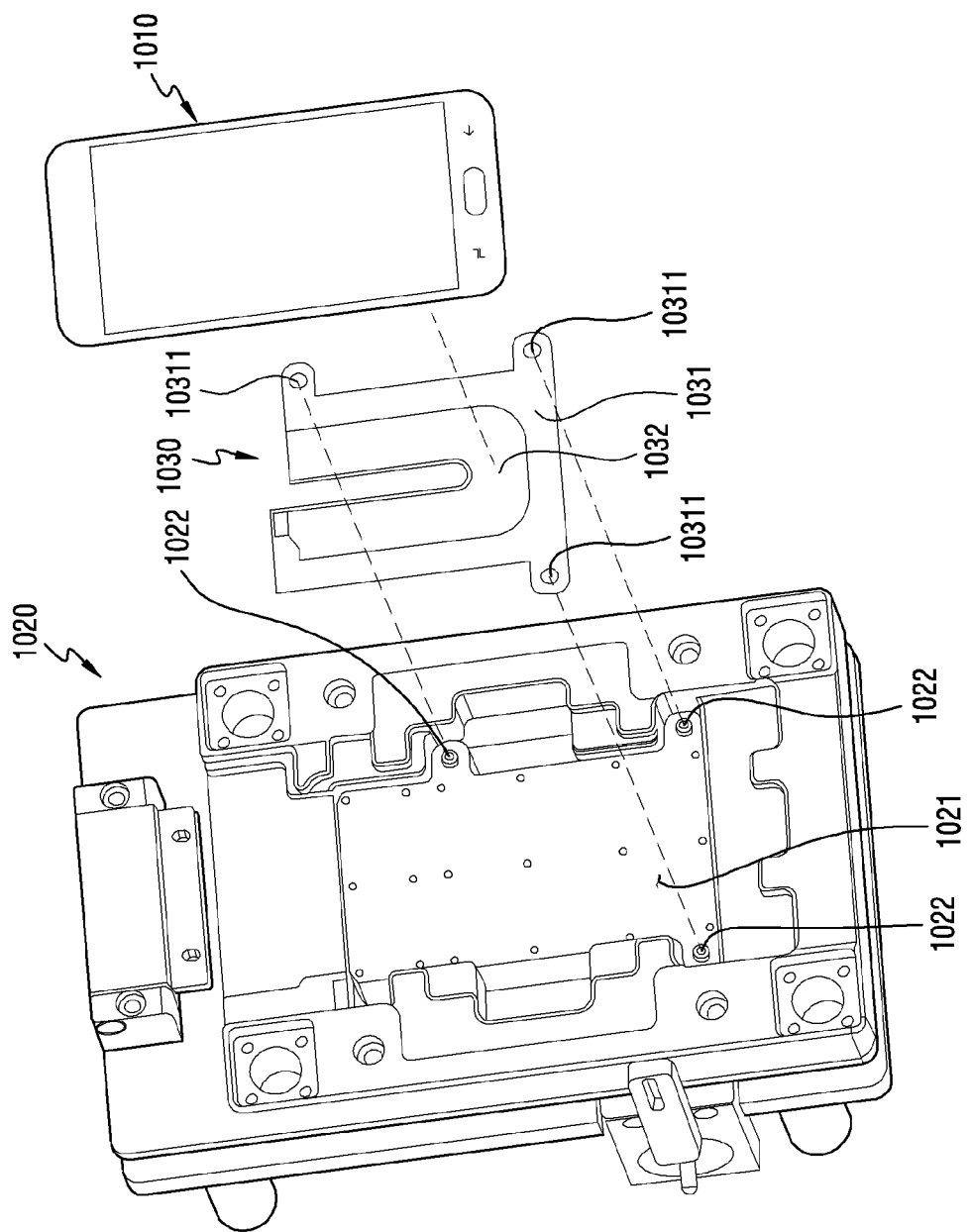
FIG. 10A illustrates a structure for attaching an adhesive member to a display according to various embodiments of the present disclosure.
Figure 10B:
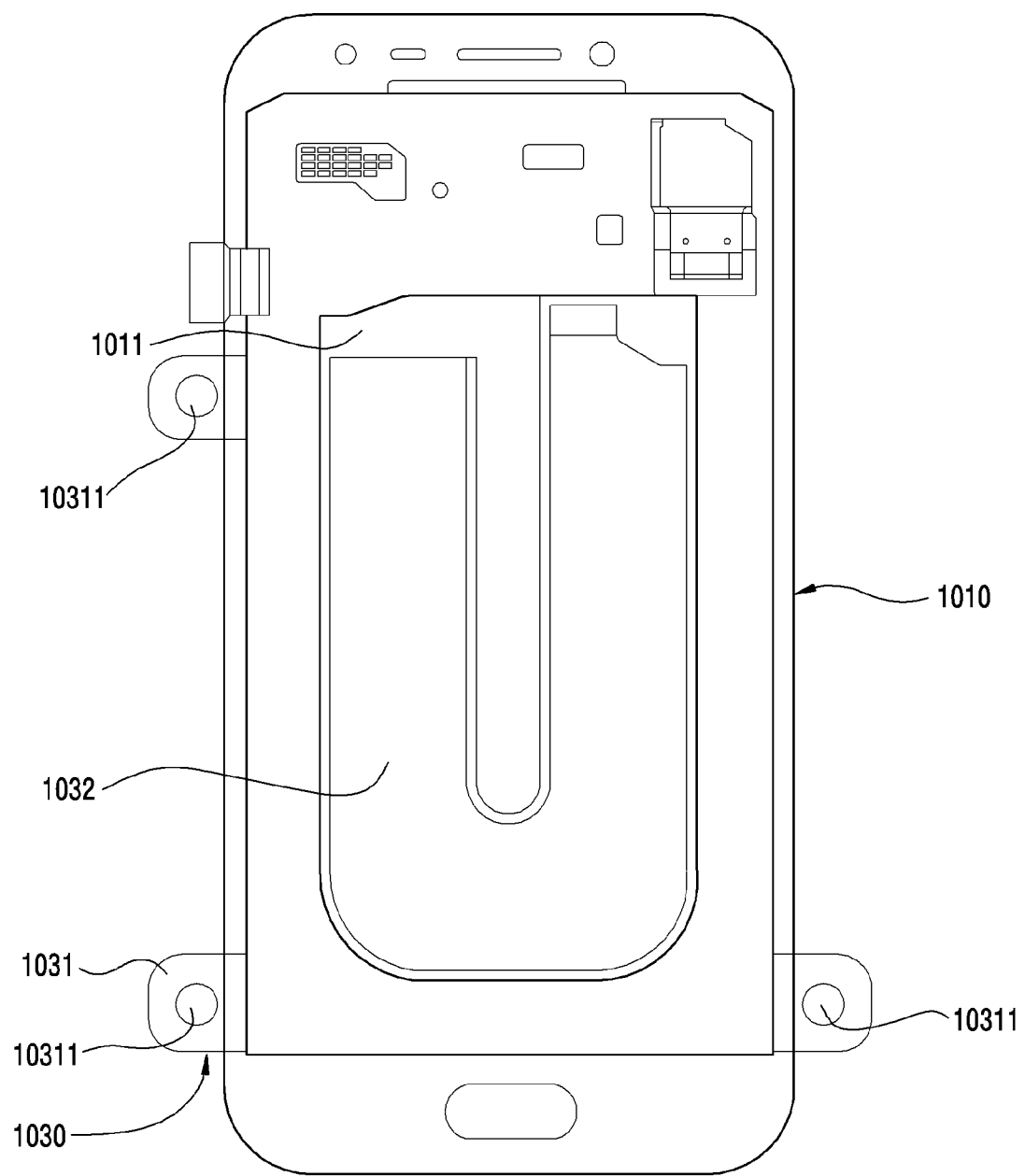
FIG. 10B illustrates a structure for attaching an adhesive member to a display according to various embodiments of the present disclosure.

FIG. 10A and FIG. 10B illustrate a structure for attaching an adhesive member to a display according to various embodiments of the present disclosure.

An adhesive member 1032 of FIG. 10A may be at least in part similar to the adhesive member 420 of FIG. 4, the adhesive member 620 of FIG. 6A, the adhesive member 720 of FIG. 7B, the adhesive member 820 of FIG. 8A, the adhesive member 830 of FIG. 8B, or the adhesive member 920 of FIG. 9, or may include other embodiments of the adhesive member.

FIG. 10A and FIG. 10B illustrate a rear side of a display 1010, i.e., a structure for attaching the adhesive member 1032 to a conductive member 1011 disposed on the rear side of the display 1010.

Referring to FIG. 10A and FIG. 10B, the adhesive member 1032 may be provided to an adhesive member assembly 1030 through a release member 1031 (e.g., a release film, release pater, etc.). In this case, the release member 1031 may be first attached to a first adhesive layer (e.g., the first adhesive layer 623-1 of FIG. 6A) facing the display 1010 of the adhesive member 1032. According to an embodiment, the release member 1031 may include at least two position fixing holes 10311 formed to be spaced apart from each other in a region other than a region to which the adhesive member 1032 is disposed.

According to various embodiments, an adhesive member attaching jig 1020 may be provided. According to an embodiment, the adhesive member attaching jig 1020 may include a mounting space 1021 on which the aforementioned adhesive member assembly 1030 can be mounted, and at least two position fixing protrusions 1022 formed to protrude outwardly may be included inside the mounting space 1021. According to an embodiment, the adhesive member attaching jig 1020 may include at least the mounting space 1021, and a guide space may be provided to guide the display 1010.

According to various embodiments, the adhesive member assembly 1030 may be mounted to the mounting space 1021 of the adhesive member attaching jig 1020. In this case, the position fixing protrusion 1022 formed in the mounting space 1021 penetrates a position fixing hole 10311 formed in the release film 1031 of the adhesive member assembly 1030, thereby preventing from being shaken or twisted during the adhesive member 1032 is attached to the display 1010. According to an embodiment, the display 1010 may be mounted to an upper portion of the mounting space 1021 to which the adhesive member assembly 1030 is mounted. Accordingly, the adhesive member 1032 may be attached to the conductive member 1011 disposed on a rear side of the display 1010, only with an operation in which the display 1010 is mounted to the adhesive member attaching jig 1020.

As shown in FIG. 10B, the release member 1031 may be removed in a state where the adhesive member assembly 1030 is attached to the conductive member 1011 of the display 1010, and the display 1010 may be adhered to a housing (e.g., the housing 410 of FIG. 4) by using an adhesive region of the adhesive member 1032 exposed by the removal of the release member 1031.

Figure 11A:
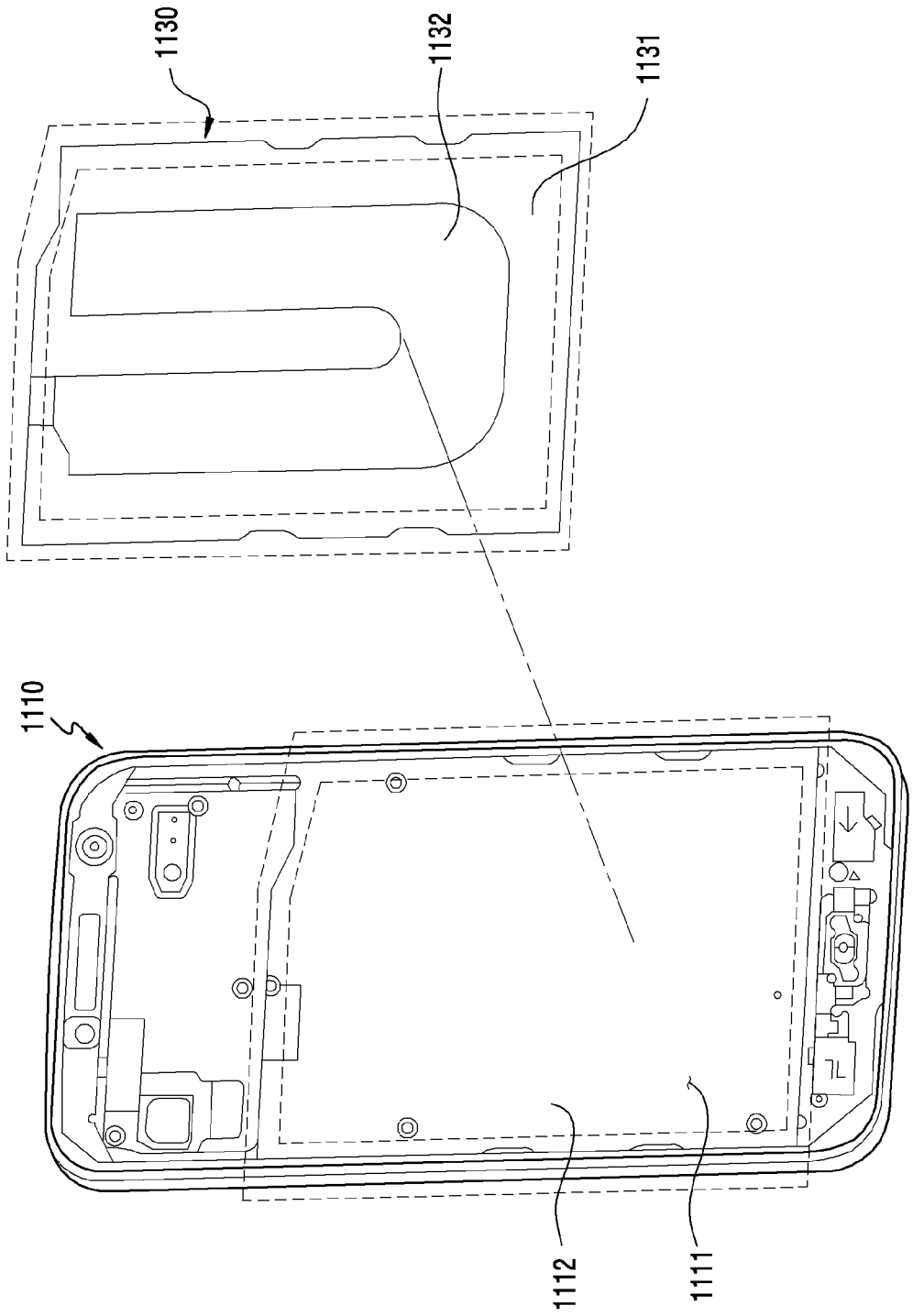
FIG. 11A illustrates a structure for attaching an adhesive member to a display after maintenance of an electronic device according to various embodiments of the present disclosure.
Figure 11B:
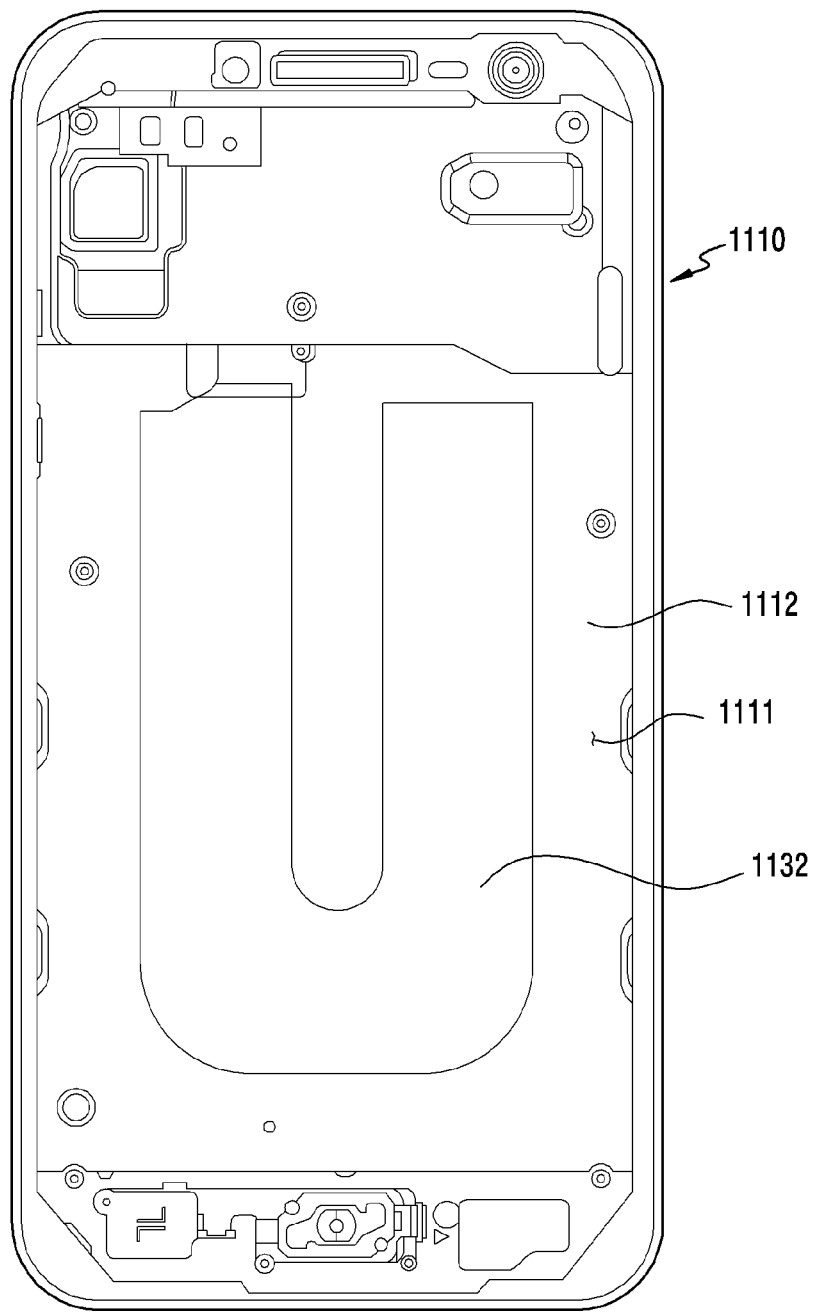
FIG. 11B illustrates a structure for attaching an adhesive member to a display after maintenance of an electronic device according to various embodiments of the present disclosure.

FIG. 11A and FIG. 11B illustrate a structure for attaching an adhesive member to a display after maintenance of an electronic device according to various embodiments of the present disclosure.

An adhesive member 1132 of FIG. 11A may be at least in part similar to the adhesive member 420 of FIG. 4, the adhesive member 620 of FIG. 6A, the adhesive member 720 of FIG. 7B, the adhesive member 820 of FIG. 8A, the adhesive member 830 of FIG. 8B, or the adhesive member 920 of FIG. 9, or may include other embodiments of the adhesive member.

FIG. 11A and FIG. 11B illustrate a structure for attaching the adhesive member 1032 to a first side 1111 (e.g., the first side 4101 of FIG. 4) of a housing 1110, when a display (e.g., the display 450 of FIG. 4) is separated from the housing 1110 and then is reassembled.

According to various embodiments, when the electronic device is initially assembled, an adhesive member is attached to a rear side of the display by using a separate jig and then the display including the adhesive member is attached to the housing. However, the adhesive member 1132 described in the present embodiment is attached manually without an additional jig after maintenance.

Referring to FIG. 11A and FIG. 11B, the adhesive member 1132 may be provided to an adhesive member assembly 1130 through a release member 1131 (e.g., a release film, release pater, etc.). In this case, the release member 1131 may be first attached to the first side 1111 of the housing 1110 through a first adhesive layer (e.g., the first adhesive layer 623-1 of FIG. 6A) facing the housing 1110 of the adhesive member 1132.

According to various embodiments, the release member 1131 may be formed to have a border with the same shape as a release member disposing space 1112 provided on the first side 1111 of the housing 1110 as indicated by a dotted line. According to an embodiment, the release member disposing space 1112 may also include a plurality of protrusions (not shown) configured to guide at least part of a border of the release member 1131 by being formed to be lower than the first side 1111 or by being disposed with regular intervals or different intervals along a border of the release member disposing space 1112.

According to various embodiments, the release member 1131 of the adhesive member assembly 1130 may be disposed on the release member disposing space 1112 provided on the first side 1111 of the housing 1110. With only such a disposition operation, the adhesive member 1132 included in the release member 1131 may be correctly attached to the first side 1111 of the housing 1110, and thereafter the release member 1131 may be separated so that an adhesive portion of the adhesive member 1132 is exposed. According to an embodiment, assembling may be complete when the housing 1110 and a display (e.g., the display 450 of FIG. 4) are combined in a state where the adhesive portion of the adhesive member 1132 is exposed.

According to various embodiments, an electronic device (e.g., the electronic device 400 of FIG. 4) may include a housing (e.g., the housing 410 of FIG. 4) including a first side (e.g., the first side 4101 of FIG. 4), a second side (e.g., the second side 4102 of FIG. 4) facing away from the first side, and a lateral side (e.g., the lateral side 4103 of FIG. 4) surrounding a space between the first side and the second side, a front plate (e.g., the front plate 460 of FIG. 4) disposed on the first side of the housing, a display (e.g., the display 450 of FIG. 4) disposed between the front plate and the first side such that at least part thereof is exposed through the front plate, at least one functional member (e.g., the conductive member 430 of FIG. 4) disposed between the display and the first side, and an adhesive member (e.g., the adhesive member 420 of FIG. 4) disposed between the functional member and the first side to attach the functional member to the housing. The adhesive member may include an adhesive portion (e.g., the adhesive portion 421 of FIG. 4) for attaching the functional member and the first side, and at least one non-adhesive portion (e.g., the non-adhesive portion 422 of FIG. 4) extending from the adhesive portion.

According to various embodiments, the adhesive member may include a base member (e.g., the base member 621 of FIG. 6A) including a first member surface (e.g., the first member surface 6211 of FIG. 6A) facing the functional member and a second member surface (e.g., the second member surface 6212 of FIG. 6A) facing the housing in a direction opposite to the first member surface, a first adhesive layer (e.g., the first adhesive layer 623-1 of FIG. 6A) disposed on at least a partial region between the first member surface and the functional member, and a second adhesive layer (e.g., the second adhesive layer 623-2 of FIG. 6A) disposed on at least a partial region between the second member surface and the first side.

According to various embodiments, adhesive strength of the first adhesive layer may be configured to be greater than or equal to adhesive strength of the second adhesive layer.

According to various embodiments, the non-adhesive portion may include a region in which the first adhesive layer is removed.

According to various embodiments, the non-adhesive portion may include a region in which both of the first adhesive layer and the second adhesive layer are removed.

According to various embodiments, the non-adhesive portion may include a region including a non-adhesive layer (e.g., the non-adhesive layer 624 of FIG. 6A) disposed on the first adhesive layer.

According to various embodiments, the non-adhesive layer may include a printed layer or a tape.

According to various embodiments, the non-adhesive portion may include a region including a non-adhesive layer disposed on the first adhesive layer and the second adhesive layer.

According to various embodiments, the adhesive portion may be formed with a specific interval and a specific length, and may be formed to be bent at least once in opposite directions According to various embodiments, the non-adhesive portion may extend from at least one of both ends of the adhesive portion.

According to various embodiments, an outer and/or inner corner of the bent portion of the adhesive portion may be formed as curved portions (e.g., the curved portions 425 and 426 of FIG. 5).

According to various embodiments, the functional member may include a polymer member (e.g., the polymer member 440 of FIG. 5), a conductive member (e.g., the conductive member 430 of FIG. 4), or a waterproof member.

According to various embodiments, the conductive member may include film-type or plate-type Copper.

According to various embodiments, a corresponding region of the housing corresponding to the non-adhesive portion may include a recess (e.g., the recess 4104 of FIG. 4) configured to receive the non-adhesive portion.

According to various embodiments, the recess may be formed to be lower than the first side of the housing, and may be formed at least to be deeper than a thickness of the non-adhesive portion.

According to various embodiments, an electronic device (e.g., the electronic device 400 of FIG. 4) may include a first structure (e.g., the housing 410 of FIG. 4), a second structure (e.g., the conductive member 430 of FIG. 4) coupled to the first structure, and an adhesive member (e.g., the adhesive member 420 of FIG. 4) disposed between the second structure and the first structure to attach the second structure to at least a partial region of the first structure. The adhesive member may include an adhesive portion (e.g., the adhesive portion 421 of FIG. 4) for attaching the first structure and the second structure, and at least one non-adhesive portion (e.g., the non-adhesive portion 422 of FIG. 4) extending from the adhesive portion.

According to various embodiments, the adhesive member may include a base member including a first member surface facing the functional member and a second member surface facing the housing in a direction opposite to the first member surface, a first adhesive layer disposed on at least a partial region between the first member surface and the functional member, and a second adhesive layer disposed on at least a partial region between the second member surface and the first side.

According to various embodiments, adhesive strength of the first adhesive layer may be configured to be greater than or equal to adhesive strength of the second adhesive layer.

According to various embodiments, the non-adhesive portion may include a region in which the first adhesive layer is removed.

According to various embodiments, the non-adhesive portion may include a region including a non-adhesive layer disposed on the first adhesive layer.

The various example embodiments disclosed herein and illustrated in the drawings are provided by way of illustration and are not intended to limit the scope of the present disclosure. Therefore, all changes or modifications derived from the technical idea of the present disclosure as well as the embodiments described herein should be understood to fall within the scope of the present disclosure.

The invention claimed is:

1. An electronic device comprising:
 a housing comprising a first side, a second side facing away from the first side, and a lateral side surrounding a space between the first side and the second side;
 a front plate disposed on the first side of the housing;
 a display disposed between the front plate and the first side such that at least part thereof is exposed through the front plate;
 at least one functional member disposed between the display and the first side; and
 an adhesive member disposed between the functional member and the first side to attach the functional member to the housing,
 wherein the adhesive member comprises an adhesive portion attached between the functional member and the first side, and at least one non-adhesive portion extending from the adhesive portion and integrally formed with the adhesive portion,
 wherein the adhesive portion includes a first portion extending from the at least one non-adhesive portion and a second portion spaced apart from the first portion by a predetermined distance and facing the first portion,
 wherein at least a part between the first portion and the second portion is bent at least once, and
 wherein the first portion, the second portion and the part between the first portion and the second portion are disposed to face a surface of the functional member facing the first side of the housing.

2. The electronic device of claim 1, wherein the adhesive member comprises:
 a base member comprising a first member surface facing the functional member and a second member surface facing the housing in a direction opposite to the first member surface;
 a first adhesive layer disposed on at least a partial region between the first member surface and the functional member; and
 a second adhesive layer disposed on at least a partial region between the second member surface and the first side.

3. The electronic device of claim 2, wherein adhesive strength of the first adhesive layer is greater than or equal to adhesive strength of the second adhesive layer.

4. The electronic device of claim 2, wherein the non-adhesive portion comprises a region in which the first adhesive layer is removed.

5. The electronic device of claim 2, wherein the non-adhesive portion comprises a region in which both of the first adhesive layer and the second adhesive layer are removed.

6. The electronic device of claim 2, wherein the non-adhesive portion comprises a region including a non-adhesive layer disposed on the first adhesive layer.

7. The electronic device of claim 6, wherein the non-adhesive layer comprises a printed layer or a tape.

8. The electronic device of claim 2, wherein the non-adhesive portion comprises a region comprising a non-adhesive layer disposed on the first adhesive layer and the second adhesive layer.

9. The electronic device of claim 1, wherein the non-adhesive portion extends from at least one of both ends of the adhesive portion.

10. The electronic device of claim 1, wherein an outer and/or inner corner of the bent portion of the adhesive portion are curved.

11. The electronic device of claim 1, wherein the functional member comprises a polymer member, a conductive member, or a waterproof member.

12. The electronic device of claim 11, wherein the conductive member comprises film-type or plate-type Copper.

13. The electronic device of claim 1, wherein a corresponding region of the housing corresponding to the non-adhesive portion comprises a recess receiving the non-adhesive portion.

14. The electronic device of claim 13, wherein the recess is lower than the first side of the housing, and is deeper than a thickness of the non-adhesive portion.

15. An electronic device comprising:
 a first structure;
 a second structure coupled to the first structure; and
 an adhesive member disposed between the second structure and the first structure to attach the second structure to at least a partial region of the first structure,
 wherein the adhesive member includes an adhesive portion for attaching the first structure and the second structure, and at least one non-adhesive portion extending from the adhesive portion and integrally formed with the adhesive portion, wherein the adhesive portion includes a first portion extending from the at least one non-adhesive portion and a second portion spaced apart from the first portion by a predetermined distance and facing the first portion, wherein at least a part between the first portion and the second portion is bent at least once, and wherein the first portion, the second portion and the part between the first portion and the second portion are disposed to face a surface of the second structure facing a surface of the first structure.

16. The electronic device of claim 15, wherein the adhesive member includes:

a base member including a first member surface facing the second structure and a second member surface facing the first structure in a direction opposite to the first member surface, a first adhesive layer disposed on at least a partial region between the first member surface and the second structure, and a second adhesive layer disposed on at least a partial region between the second member surface and the first structure.

17. The electronic device of claim 16, wherein adhesive strength of the first adhesive layer is greater than or equal to adhesive strength of the second adhesive layer.

18. The electronic device of claim 16, wherein the non-adhesive portion includes a region in which the first adhesive layer is removed.

19. The electronic device of claim 16, the non-adhesive portion includes a region including a non-adhesive layer disposed on the first adhesive layer.

* * * * *